United States Patent
Hirai et al.

(10) Patent No.: US 12,405,755 B2
(45) Date of Patent: Sep. 2, 2025

(54) PRINTING APPARATUS, CONTROL METHOD, AND STORAGE MEDIUM FOR STORING PROGRAM

(71) Applicant: CANON KABUSHIKI KAISHA, Tokyo (JP)

(72) Inventors: Yoshiyuki Hirai, Tokyo (JP); Tokiko Watanabe, Tokyo (JP); Wahei Sugawara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 18/512,456

(22) Filed: Nov. 17, 2023

(65) Prior Publication Data
US 2024/0192904 A1     Jun. 13, 2024

(30) Foreign Application Priority Data
Dec. 13, 2022   (JP) .................. 2022-198737

(51) Int. Cl.
G06F 3/12     (2006.01)

(52) U.S. Cl.
CPC .......... G06F 3/1236 (2013.01); G06F 3/1203 (2013.01); G06F 3/1287 (2013.01)

(58) Field of Classification Search
CPC ..... G06F 3/1236; G06F 3/1203; G06F 3/1287
USPC ........................................ 358/1.15
See application file for complete search history.

(56) References Cited

U.S. PATENT DOCUMENTS

| | | | |
|---|---|---|---|
| 2002/0147819 A1 | 10/2002 | Miyakoshi et al. | |
| 2011/0222118 A1* | 9/2011 | Mukaiyama | G06F 3/1225 358/1.15 |
| 2018/0364959 A1* | 12/2018 | Inoue | H04W 52/0258 |

FOREIGN PATENT DOCUMENTS

JP     2002-359623 A     12/2002

* cited by examiner

*Primary Examiner* — Allen H Nguyen
(74) *Attorney, Agent, or Firm* — VENABLE LLP (57) ABSTRACT

A printing apparatus capable of executing printing based on a flat-rate use service includes a first connection unit for first connection between a printing apparatus and a first apparatus and for which a first method is used, and a second connection unit for second connection between the printing apparatus and a second apparatus and for which a second method is used. A detection unit detects that the second connection has been established, and a control unit causes the printing apparatus to operate in a predetermined mode for performing setting for establishing the first connection. Even if it is detected while the printing apparatus is operating in the predetermined mode that the second connection has been established, the control unit causes the printing apparatus to continue operation in the predetermined mode.

21 Claims, 7 Drawing Sheets

PRINTING APPARATUS, CONTROL METHOD, AND STORAGE MEDIUM FOR STORING PROGRAM

BACKGROUND OF THE INVENTION

Field of the Invention

The present invention relates to a printing apparatus capable of performing settings for connecting with an external device, a control method, and a storage medium for storing a program.

Description of the Related Art

Printing apparatuses that have a communication function by which communication can be performed using a plurality of forms of connection by wireless, USB, and the like are known. Normally, in printing apparatuses with such a communication function, a communication mode, which is for connecting with an information processing apparatus using one of the forms of connection, is set. Japanese Patent Laid-Open No. 2002-359623 discloses a communication apparatus capable of receiving communication information of an information processing apparatus and automatically setting a communication mode according to that communication information.

SUMMARY OF THE INVENTION

Incidentally, as forms in which settings are made for connecting a printing apparatus to a network become widespread, it becomes necessary to appropriately execute operation in a mode for performing settings for connecting a printing apparatus to a network.

The present invention provides a printing apparatus that appropriately executes operation in a mode for performing settings for connecting the printing apparatus to network, a control method, and a storage medium for storing a program.

The present invention in one aspect provides a printing apparatus capable of executing printing based on a flat-rate use service, the printing apparatus comprising: at least one memory and at least one processor which function as: a first connection unit for first connection which is between a printing apparatus and a first apparatus and for which a first method is used; a second connection unit for second connection which is between the printing apparatus and a second apparatus and for which a second method is used; a detection unit configured to detect that the second connection has been established; and a control unit configured to cause the printing apparatus to operate in a predetermined mode for performing setting for establishing the first connection, wherein even if it is detected while the printing apparatus is operating in the predetermined mode that the second connection has been established, the control unit causes the printing apparatus to continue operation in the predetermined mode.

According to the present invention, it is possible to appropriately execute operation in a mode for performing settings for connecting a printing apparatus to a network.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

A printing apparatus that includes a communication function according to the present embodiment will be described with reference to FIG. 1. Although a printer is given as an example of the printing apparatuses in the present embodiment, the present invention is not limited thereto, and various kinds of apparatuses can be adopted so long as they can be connected to an information processing apparatus, which will be described below. In case of a printer, for example, an inkjet printer, a full-color laser beam printer, a monochrome printer, and the like can be adopted. Further, not only a printer but also a copy machine, a fax machine, a portable terminal, a smartphone, a notebook personal computer (PC), a tablet terminal, a personal digital assistant (PDA), a digital camera, and the like can be adopted. In addition, a multifunction peripheral, which includes a copy function, a fax function, and a print function, can be adopted. Further, although a PC is given as an example of the information processing apparatus in the present embodiment, the present invention is not limited thereto, and various kinds of apparatuses, such as a portable terminal, a smartphone, a tablet terminal, a PDA, a digital camera, and the like can be adopted.

First, a configuration of the printing apparatus will be described with reference to a block diagram of FIG. 1. Further, although description will be given in the present embodiment using the following configuration as an example, any printing apparatus capable of being connected to an information processing apparatus 200 and a cloud server 300 (FIG. 4) can be adopted, and the present invention is not limited to the configuration of FIG. 1 and has, as appropriate, a configuration that can be realized by an apparatus that is adopted as a printing apparatus 100.

A CPU 101 is a system control unit and controls the entire printing apparatus 100. A ROM 102 stores fixed data, such as control programs, data tables, and an embedded operating system (OS) program to be executed by the CPU 101. The respective control programs stored in the ROM 102 perform, for example, software execution control, such as scheduling, task switching, and interrupt processing, under the control of the embedded OS program stored in the ROM 102. The fixed data may be stored in a hard disk (HDD) 117. A RAM 103 is configured by a static random access memory (SRAM) or the like, which necessitates a backup power supply, and data is held using a primary battery for data backup (not illustrated). The RAM 103 stores program control variables and the like. Further, the RAM 103 is provided with a memory area for storing, for example, user-registered setting values, such as wireless LAN settings, and management data of the printing apparatus 100 as well as information indicating whether the printing apparatus 100 is being set for the first time after a power-on (hereinafter, initial settings state).

An image memory 104 is configured by a dynamic random access memory (DRAM) or the like and stores image data. In the image memory 104, a portion of the region is reserved as a work area for executing software processing. A data conversion unit 105 performs image data generation, such as analysis of page description language (PDL) and the like and decompression of character data computer graphics (CG). The data conversion unit 105 is capable of performing processing for decompressing compressed image data received from the information processing apparatus 200.

A reading unit 107 optically reads a document using a contact image sensor (CIS). A reading control unit 106 converts an image read by the reading unit 107 into electrical image data, performs various kinds of image processing, such as binarization processing and halftone processing, and outputs high-definition image data via an image processing control unit (not illustrated). The reading control unit 106 and the reading unit 107 may use either of the following two control methods. Specifically, one method is a sheet reading control method in which reading is performed by a fixed CIS while a document is being conveyed. The other method is a book reading control method in which a document fixed to a document table is scanned by a moving CIS.

A display operation unit 108 is configured by, for example, a liquid crystal display (LCD), a light-emitting diode (LED), and keys, such as numerical value input keys, a mode setting key, a decide key, and a cancel key. The printing apparatus 100 activates various kinds of functions of the printing apparatus 100 and performs various kinds of settings for the printing apparatus 100 by being operated by a user via the display operation unit 108. The display operation unit 108 may be configured without the LCD. A fax communication control unit 109 is connected to a telephone line and transmits and receives fax image data to and from a fax machine (not illustrated). A resolution conversion processing unit 110 performs resolution conversion control, such as conversion between millimeter-system image data and inch-system image data and enlargement/reduction processing. An encoding/decoding processing unit 111 performs encoding/decoding processing and enlargement/reduction processing of image data (uncompressed, MH, MR, MMR, JBIG, JPEG, and the like) handled by the printing apparatus 100. A print control unit 112 converts image data to be printed into high-definition image data by performing various kinds of image processing, such as smoothing processing, print density correction processing, and color correction, using an image processing control unit (not illustrated) and outputs the high-definition image data to a printing unit 113. The printing unit 113 is an electrophotographic or inkjet printing unit and prints an image onto a printing medium, such as printing paper, based on color image data or monochrome image data generated by the print control unit 112.

A Universal Serial Bus (USB) function control unit 114 performs connection control of a USB interface with a peripheral device and performs protocol control according to a USB connection standard. Specifically, the USB function control unit 114 converts data from a USB function control task executed by the CPU 101 into a packet and transmits a USB packet to the information processing apparatus 200. Further, the USB function control unit 114 converts a USB packet from the information processing apparatus 200 into data and transmits the data to the CPU 101. Further, the USB function control unit 114 can detect that the printing apparatus 100 is connected to the information processing apparatus 200 over USB. A USB host control unit 115 is a control unit for performing connection using a protocol defined by the USB connection standard. The USB connection standard is a standard by which high-speed two-way data connection can be performed, and by using this standard, a plurality of hubs or functions (slaves) can be connected to a single host (master). The USB host control unit 115 has a function of the host in USB connection.

A WLAN unit 116 connects with a terminal on a network (network capable of performing connection according to TCP/IP) via wireless connection. The WLAN unit 116 includes an access point (hereinafter, referred to as AP) 118, which connects with another apparatus via wireless connection, and is capable of performing WLAN connection with the information processing apparatus 200 and the cloud server 300. The WLAN unit 116 is capable of data (packet) communication in a wireless local area network (hereinafter, referred to as WLAN) system conforming to, for example, an IEEE 802.11 series.

By a communication mode being set, the printing apparatus 100 operates so as to be capable of communication via the WLAN unit 116 using a form of connection that accords with that communication mode. In the printing apparatus 100, a communication mode, such as a soft AP mode, a Wi-Fi Direct® (hereinafter, referred to as WFD) mode, a WFD extension mode, an infrastructure mode, or an ad hoc mode, is set.

The soft AP mode is one of the modes that are used at the time of setting a communication mode in the printing apparatus 100 and is a mode in which operation is performed with the AP 118 being enabled according to software settings. When the printing apparatus 100 is operating in the soft AP mode, the printing apparatus 100 periodically transmits a beacon signal (packet), which includes its own service set identifier (SSID) and the like. Therefore, an information processing apparatus capable of communicating with the printing apparatus 100 can detect the AP 118 by performing an AP search. An SSID of the AP 118 is configured to be in a format that follows a predetermined rule, and an information processing apparatus can identify the printing apparatus 100 by recognizing that rule. By identifying the AP 118, the information processing apparatus communicates with the printing apparatus 100 using peer-to-peer (hereinafter, referred to as P2P) via the AP 118. For example, information by which a model of the printing apparatus 100 or a series that includes that model is identified as well as a MAC address, a manufacturer name, and the like of the printing apparatus 100 are used as the aforementioned rule. The SSID may be stored in advance in the ROM 102 or the like. The printing apparatus 100 can set a communication mode that accords with a status of a neighboring network of the printing apparatus 100 by entering the soft AP mode. For example, the setting of a communication mode is performed by receiving information (such as AP information, which will be described later) of a neighboring network of the printing apparatus 100 from the information processing apparatus. In the present embodiment, the printing apparatus 100 operates in a setting mode for receiving AP information from a connection partner apparatus and setting its own communication mode, and it is assumed that the soft AP mode is used as the setting mode. The printing apparatus 100 starts operation in the soft AP mode based on a soft AP mode operation condition being satisfied. The soft AP mode operation condition is, for example, the printing apparatus 100 being powered on in a state in which initial settings of the printing apparatus 100 have not been completed and processing that is to be started after the power-on and is necessary for the initial settings state has ended. The soft AP mode operation condition is not limited to this form and may only be that the printing apparatus 100 is powered on in a state in which initial settings for the printing apparatus 100 have not been completed. That is, operation in the soft AP mode may be started immediately upon the printing apparatus 100 being powered on in a state in which initial settings for the printing apparatus 100 have not been completed. Further, there may be a plurality of soft AP mode operation conditions. Therefore, there may be a soft AP mode operation condition which is different from a condition whose content is as described above and whose content is that, for example, an operation which is for causing operation in the soft AP mode but is different from a power-on operation that has been executed on a communication apparatus 151.

The WFD mode is a mode in which wireless connection that is based on WFD is performed. When the printing apparatus 100 is operating in the WFD mode, the printing apparatus 100 performs a direct P2P wireless connection with an information processing apparatus (connection partner device) to which the printing apparatus 100 is to be connected. At this time, it is decided according to Group Owner Negotiation which apparatus' AP to perform connection through. The WFD extension mode is a mode in which an extension service is performed based on WFD. When the printing apparatus 100 is operating in the WFD extension mode, after performing WFD-based Group Owner Negotiation with a connected partner device, the printing apparatus 100 further performs negotiation of services that are supported therebetween and executes those services.

The infrastructure mode is a mode in which the printing apparatus 100 wirelessly connects with an information processing apparatus through an AP in an apparatus other than the printing apparatus 100. In order to operate in the infrastructure mode, the printing apparatus 100 receives, from a connection partner apparatus or the like, an SSID of an AP to be used by the printing apparatus 100 in the infrastructure mode and parameters for the printing apparatus 100 to use that AP and registers the SSID and the parameters in the printing apparatus 100 itself. The parameters for using an AP are called AP information.

The ad hoc mode is a mode in which the printing apparatus 100 and a connection partner apparatus perform a direct P2P wireless connection. Unlike the WFD mode and the WFD extension mode, the ad hoc mode performs connection without going through an AP in an apparatus with which connection is to be performed. In order for the printing apparatus 100 to operate in the ad hoc mode, wireless connection parameters that are in common with those of the connection partner apparatus need to be registered in the printing apparatus 100.

The above-described modes are not only set exclusively; a plurality of modes may be set at the same time. The components illustrated in FIG. 1 are connected so as to be capable of communicating with each other via a CPU bus 121 managed by the CPU 101.

A configuration of the information processing apparatus 200 to be connected with the printing apparatus 100 will be described with reference to a block diagram of FIG. 2. In the present embodiment, description will be given using the following configuration as an example; however, regarding the information processing apparatus 200, any apparatus capable of performing connection with the printing apparatus 100 can be adopted, and the present invention is not limited to the configuration of FIG. 2 and has, as appropriate, a configuration that can be realized by an apparatus that is adopted as the information processing apparatus 200.

A CPU 201 executes a program read out, for example, from a ROM 202, a hard disk (HDD) 211, a RAM 203 or an internal storage device 204 or from an external storage disk 206 by an external storage device 205. The CPU 201 controls the operation of the entire information processing apparatus 200 through a system bus. The ROM 202 or the hard disk (HDD) 211 stores, for example, control programs to be executed by the CPU 201. The RAM 203 is configured by a static random access memory (SRAM) or the like, which necessitates a backup power supply, and data is held using a primary battery for data backup (not illustrated). The RAM 203 stores program control variables and the like. The internal storage device 204 stores, for example, various kinds of application programs, such as an operating system and a wireless LAN settings app, and image data. Regarding these pieces of application software, the external storage disk 206 (such as a CD/DVD medium) may receive data from another computer-readable medium in which these pieces of application software are stored, and these pieces of application software may be installed in the information processing apparatus 200 under the control of the external storage device 205. An operation unit 207 controls a keyboard or a mouse (not illustrated), which are components for inputting an instruction from a user. A display unit 208 performs various kinds of display of a user interface screen and the like. An AP 212 connects with the printing apparatus 100 or another information processing apparatus by wireless connection. A WLAN unit 209 connects with a terminal on a network (network capable of performing connection according to TCP/IP) via wireless connection. A USB host control unit 210 is a control unit for performing connection using a protocol defined by the USB connection standard. The USB host control unit 210 has a function of the host in USB connection and performs connection with the printing apparatus 100.

A configuration of the cloud server 300 to be connected with the printing apparatus 100 will be described with reference to a block diagram of FIG. 3. In the present embodiment, description will be given using the following configuration as an example; however, regarding the cloud server 300, any apparatus capable of performing connection with the printing apparatus 100 can be adopted, and the present invention is not limited to the configuration of FIG. 3 and has, as appropriate, a configuration that can be realized by an apparatus that is adopted as the cloud server 300.

The cloud server 300 includes a mainboard 310 for controlling the entire apparatus, a network connection unit 301, and a hard disk unit 302. A CPU 311, which is disposed on the mainboard 310, controls the operation of the entire cloud server 300 according to a control program stored in a program memory 313, which is connected through an internal bus 312, and data stored in a data memory 314. By controlling the network connection unit 301 via a network control circuit 315, the CPU 311 connects to a network, such as the Internet 404, and thereby communicates with another apparatus. The CPU 311 is capable of reading and writing data to and from the hard disk unit 302, which is connected via a hard disk control circuit 316. The hard disk unit 302 stores an operating system to be loaded into the program memory 313 and used, control software of the cloud server 300, and various types of data. A GPU 317 is connected to the mainboard 310 and can be made to execute various kinds of computational processing in place of the CPU 311.

Figure 1:
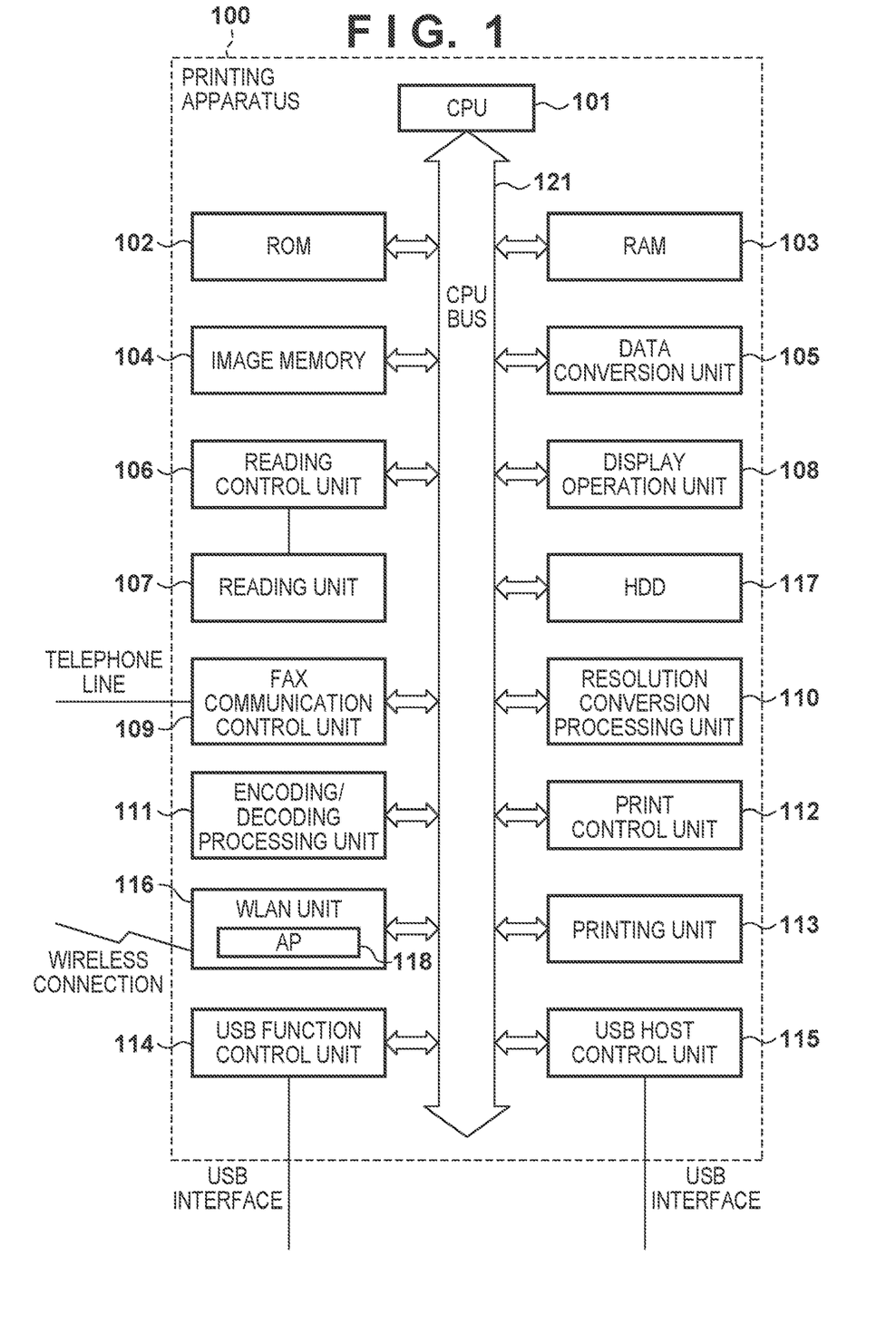
FIG. 1 is a diagram illustrating a configuration of a printing apparatus.
Figure 2:
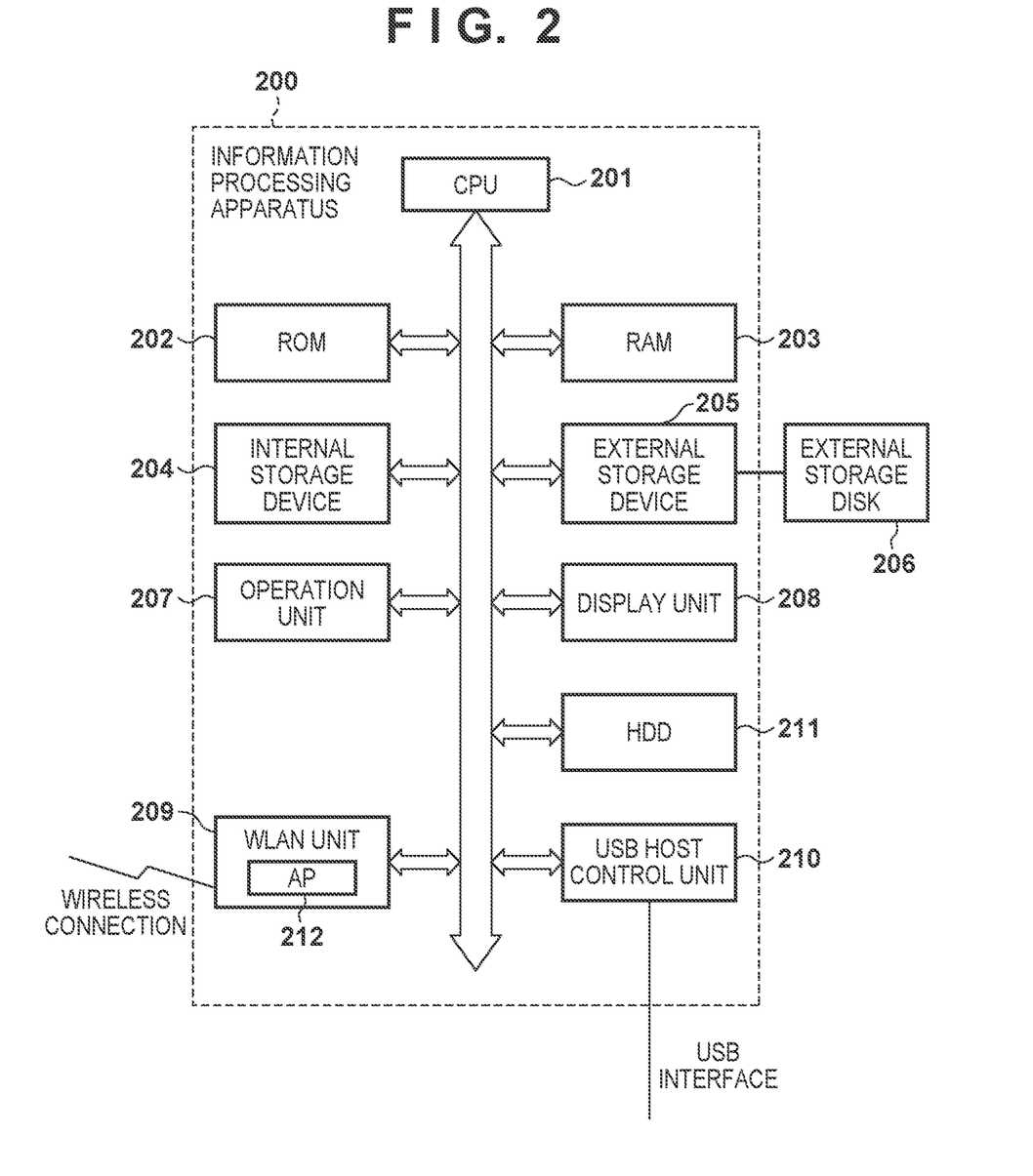
FIG. 2 is a diagram illustrating a configuration of an information processing apparatus.
Figure 3:
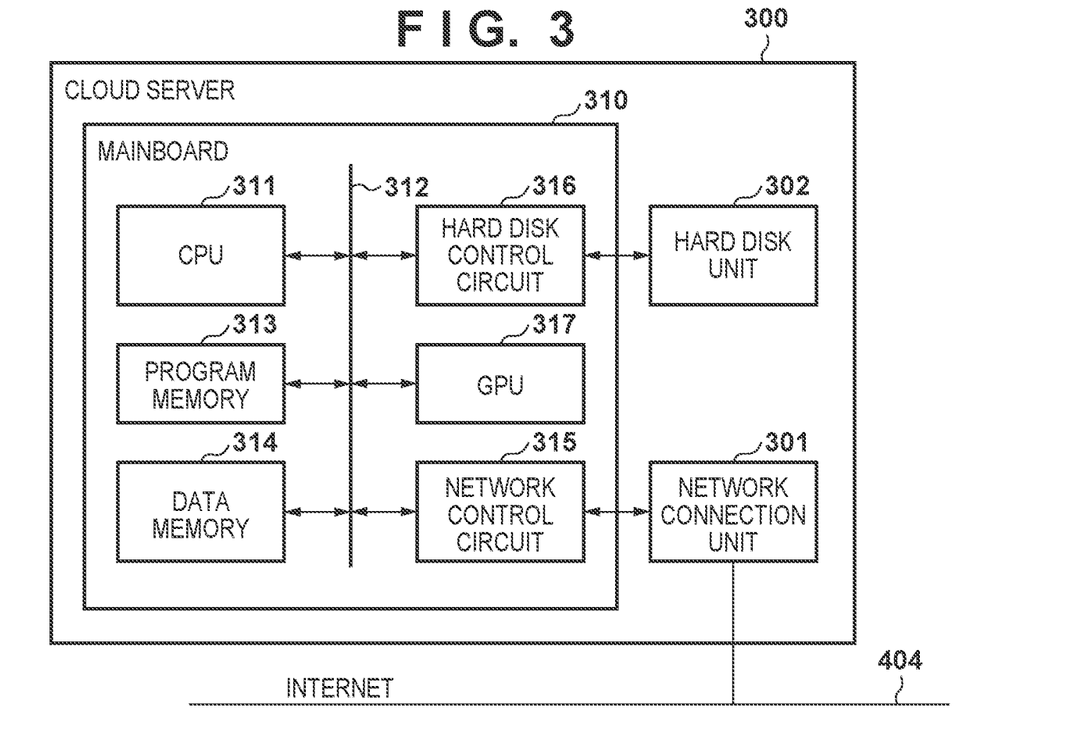
FIG. 3 is a diagram illustrating a configuration of a cloud server.
Figure 4:
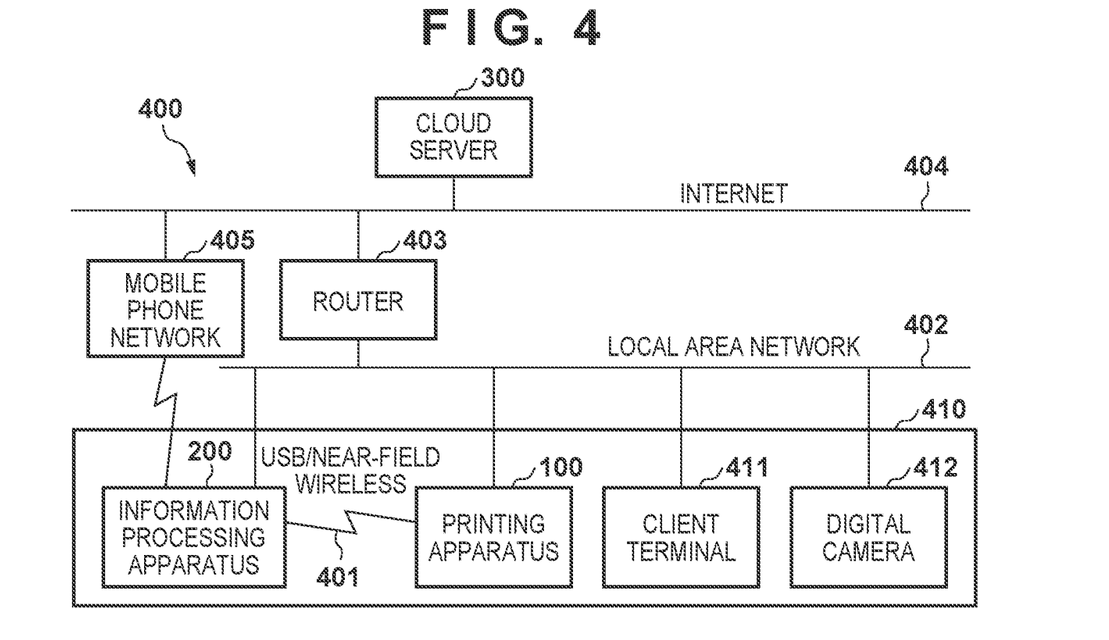
FIG. 4 is a diagram illustrating a configuration of a printing system.

FIG. 4 is a diagram illustrating an example of a configuration of a printing system 400, which includes the printing apparatus 100 of FIG. 1, the information processing apparatus 200 of FIG. 2, and the cloud server 300 of FIG. 3. The printing system 400 is configured by the cloud server 300 and a group of devices 410, which are connected by a local area network 402 and the Internet 404. The group of devices 410 includes various kinds of apparatuses capable of network connection. For example, the group of devices 410 includes the information processing apparatus 200, the printing apparatus 100, and a client terminal 411, such as a personal computer or a workstation, as well as a device, such as a digital camera 412. However, the group of devices 410 are not limited to these kinds of apparatuses and may include, for example, home appliances, such as a refrigerator, a TV, and an air conditioner. The group of devices 410 are connected to each other by the local area network 402 and can connect to the Internet 404 via a router 403, which is provided on the local area network 402. Here, although illustrated as a device connecting the local area network 402 and the Internet 404, the router 403 may be configured to have a wireless LAN access point function that constitutes the local area network 402. In such a case, each device of the group of devices 410 may be configured to connect with the access point by a wireless LAN in order to join the local area network 402, in addition to connecting with the router 403 by a wired LAN. For example, the printing apparatus 100 and the client terminal 411 may be configured to be connected by a wired LAN, and the information processing apparatus 200 and the digital camera 412 may be configured to be connected by a wireless LAN. Each device of the group of devices 410 can communicate with the cloud server 300 via the Internet 404 to which the device is connected via the router 403. The devices of the group of devices 410 can also communicate with each other via the local area network 402.

The information processing apparatus 200 and the printing apparatus 100 can communicate with each other by USB or near-field wireless communication 401. Near-field wireless communication is, for example, wireless communication that conforms to a Bluetooth® standard and an NFC standard. The information processing apparatus 200 is also connected to a mobile phone network 405 and is capable of communicating with the cloud server 300 through the mobile phone network 405. The configuration of FIG. 4 is an example, and the present invention is not limited to the configuration illustrated in FIG. 4. For example, although an example in which the router 403 includes an access point function is illustrated, the access point may be an apparatus different from the router 403.

In the present embodiment, it is assumed that the printing apparatus 100 is an apparatus that supports a predetermined flat-rate use service (subscription service) and is capable of executing printing based on a flat-rate use service contract. Although contents of the flat-rate use service contract are not particularly limited, in the present embodiment, a contract in which a predetermined number of copies to be printed, which corresponds to the contract, becomes available to the printing apparatus 100 by the user of the printing apparatus 100 paying a flat-rate fee on a monthly basis is assumed. The predetermined flat-rate use service is, for example, a subscription service for ink, replacement components, and the like of the printing apparatus 100. According to the printing system 400 of FIG. 4, upon receiving authentication of the flat-rate use service contract from the cloud server 300, the printing apparatus 100 receives a print job from the information processing apparatus 200 and enters a state in which it can perform printing. Specifically, for example, the printing apparatus 100, which supports the flat-rate use service and is associated with the flat-rate use service contract, notifies the cloud server 300 of a remaining amount of ink of a certain color held in the printing apparatus 100 itself becoming less than or equal to a predetermined threshold. The cloud server 300 then determines whether to deliver new ink to an address of the user of the printing apparatus 100 based on contents of the flat-rate use service contract associated with the user of the printing apparatus 100 and delivers the new ink. In addition, for example, the printing apparatus 100, which supports a corresponding subscription service and is associated with the flat-rate use service contract, notifies the cloud server 300 of an amount of ink contained in a waste ink tank becoming greater than or equal to a predetermined threshold. The cloud server 300 then determines whether to deliver a new waste ink tank to an address of the user of the printing apparatus 100 based on the contents of the flat-rate use service contract associated with the user of the printing apparatus 100 and delivers the new waste ink tank. In addition, for example, the printing apparatus 100, which supports a corresponding subscription service and is associated with the flat-rate use service contract, notifies the cloud server 300 of an amount of paper of a certain size held in the printing apparatus 100 itself becoming greater than or equal to a predetermined threshold. The cloud server 300 then determines whether to deliver new sheets to an address of the user of the printing apparatus 100 based on the contents of the flat-rate use service contract associated with the user of the printing apparatus 100 and delivers the new sheets. The flat-rate use service contract is a contract related to service contents and payment of the subscription service. In addition, the cloud server 300 manages contract information associated with each user, and the contract information is information indicating contents of the flat-rate use service contract associated with each user. The flat-rate use service contract associated with a user is also associated with the printing apparatus 100, which is owned by that user. In other words, the flat-rate use service contract associated with the user is a flat-rate use service contract associated with the printing apparatus 100, which is owned by the user. In other words, the contract information associated with the user is contract information associated with the printing apparatus 100.

In order to execute printing according to the flat-rate use service contract, the printing apparatus 100, which supports the flat-rate use service, needs to communicate, as appropriate, with the cloud server 300. Specifically, for example, in order confirm whether the flat-rate use service contract is active and provide information on printing materials and sheets used for printing, the printing apparatus 100, which supports the flat-rate use service, communicates, as appropriate, with the cloud server 300. Therefore, it is assumed that the printing apparatus 100, which supports the flat-rate use service, is controlled so as to not be able to execute various kinds of functions, such as printing, unless connected to a network that is a path for communicating with the cloud server 300. In the present embodiment, the network that is a path for communicating with the cloud server 300 is a network formed by the router 403 and is a network that allows Internet communication. That is, it is assumed that the printing apparatus 100, which supports the flat-rate use service, is controlled so as to not be able to execute various kinds of functions, such as printing, unless the printing apparatus 100 is in a state in which it is connected to the router 403 and can communicate with the cloud server 300.

The printing apparatus 100 can also be connected to the information processing apparatus 200 by a USB cable. However, as described above, even if the printing apparatus 100 is connected with the information processing apparatus 200 by a USB cable and receives a print job from the information processing apparatus 200 through the USB cable, the printing apparatus 100 will not be able to execute printing unless connected to the router 403. Therefore, if control for not operating in the setting mode is executed due to the printing apparatus 100 being connected with the information processing apparatus 200 by a USB cable, there is a possibility that the printing apparatus 100 will continue operation in a state in which it cannot execute printing. Similarly, if control for canceling the setting mode is executed due to the printing apparatus 100 being connected with the information processing apparatus 200 by a USB cable while operating in the setting mode, there is a possibility that the printing apparatus 100 will continue operation in a state in which it cannot execute printing. In the present embodiment, an embodiment in which operation in the setting mode is appropriately executed will be described.

Figure 5:
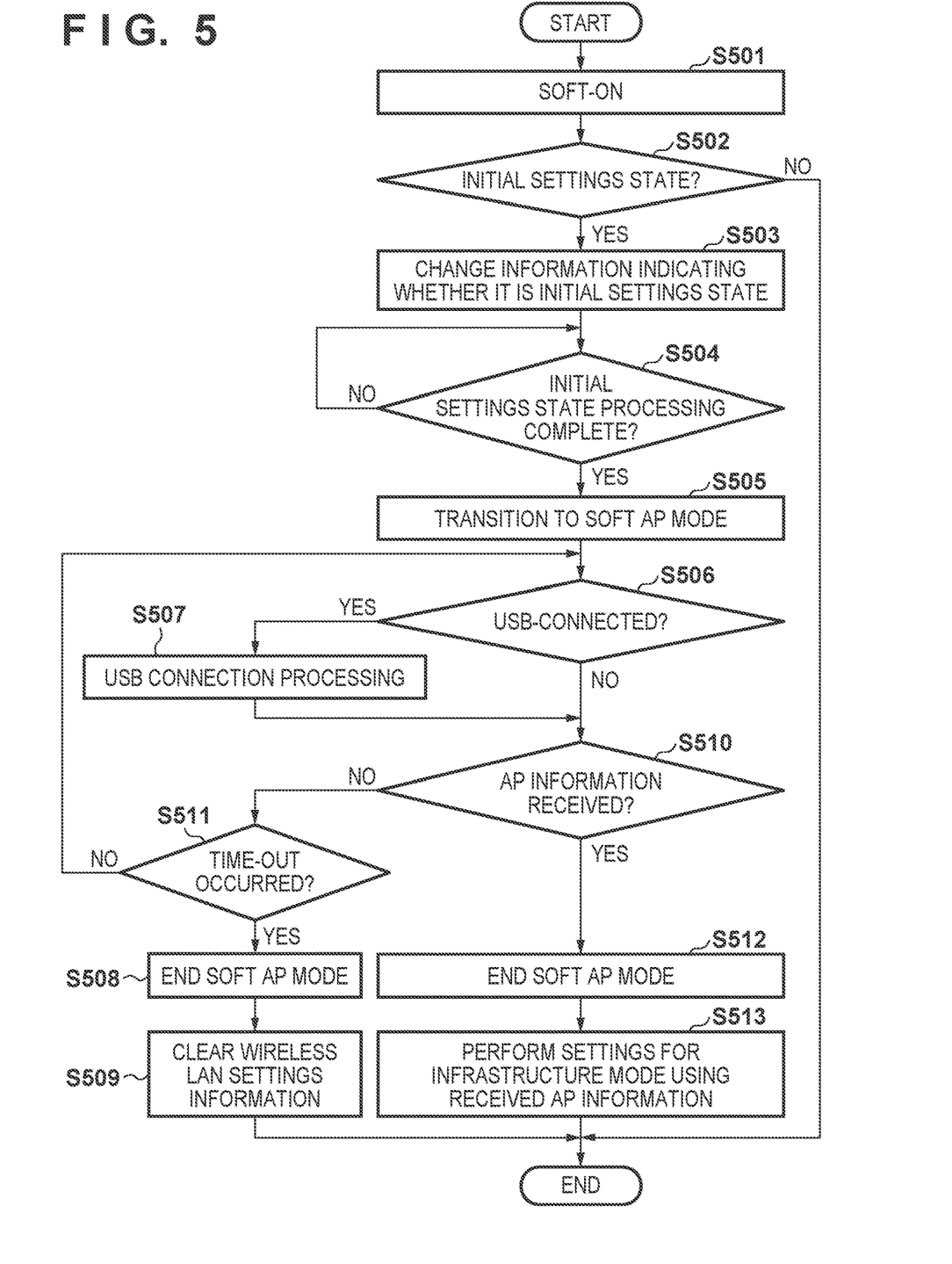
FIG. 5 is a flowchart illustrating processing of the printing apparatus.

FIG. 5 is a flowchart for explaining processing that the printing apparatus 100 executes at the initial settings state according to the present embodiment. The processing of FIG. 5 is realized by the CPU 101 loading a control program stored in the ROM 102 or the HDD 117 to the RAM 103 and executing the control program.

In step S501, upon detecting a press of a power button of the display operation unit 108 by the user, the CPU 101 causes a power state of the printing apparatus 100 to transition to a soft-on state. The soft-on state is a state in which, by the power button of the display operation unit 108 being pressed while a power supply is connected to and hardware power is on but software (such as a main program) is not operating, the software is started up.

In step S502, the CPU 101 determines whether the current state of the printing apparatus 100 is an initial settings state by referencing information which indicates whether it is initial settings state and which is stored in the RAM 103. Specifically, if it is the first time that the user starts up the printing apparatus 100, an initial settings state flag in the RAM 103 is on. Meanwhile, in second and subsequent startup processing of the printing apparatus 100, the initial settings state flag in the RAM 103 is off due to processing of step S503, which will be described later. The CPU 101 executes the determination processing of step S502 by referencing whether the initial settings state flag is on or off. If it is determined in step S502 that it is the initial settings state, the processing proceeds to step S503. Meanwhile, if it is determined that it is not the initial settings state, the processing of FIG. 5 is ended.

Normally, if it is not the initial settings state, the communication mode does not need to be set again, unless a connection environment of the printing apparatus 100 has been changed or the like. In the present embodiment, by providing the determination processing of step S502, it is possible to avoid repetition of processing for setting the communication mode every time the printing apparatus 100 is powered on. A configuration may be taken so as to, if it is determined in step S502 that it is the time of initial setting, display a user interface screen or the like asking the user whether to perform the processing for setting the communication mode and execute the subsequent processing according to the user's instruction.

In step S503, the CPU 101 starts processing necessary for the initial settings state, such as cleaning of the apparatus. Then, the CPU 101 changes the initial settings state flag to off. This makes it possible to indicate that it is not the initial settings state when the printing apparatus 100 is started up thereafter. In the present embodiment, the determination of step S502 is performed based on whether the initial settings state flag is on or off; however, information other than the flag may be used. For example, the information indicating that it is the initial settings state may be stored in the RAM 103. Then in step S502, it may be determined whether the information indicating that it is the initial settings state is stored in the RAM 103, and in step S503, the information indicating that it is the initial settings state may be deleted. The processing of step S503 may be executed at a timing different from that of FIG. 5 so long as it is after the processing for determining whether it is the initial settings state. For example, the processing may be executed after the communication mode has been set in the printing apparatus 100 in step S513 or after information on wireless LAN settings of the printing apparatus 100 has been cleared in step S509.

In step S504, the CPU 101 determines whether the processing necessary for the initial settings state, such as cleaning, has been completed. If it is determined that the processing has not been completed, the CPU 101 repeats step S504 until it is determined that the processing necessary for the initial settings state has been completed. If it is determined that the processing necessary for the initial settings state has been completed, the processing proceeds to step S505. The processing of step S504 may be executed at a timing different from that of FIG. 5 so long as it is after the processing for determining whether it is the initial settings state. For example, the processing may be executed after the communication mode has been set in the printing apparatus 100 in step S513 or after information on wireless LAN settings of the printing apparatus 100 has been cleared in step S509.

Since the soft AP mode operation condition has been satisfied, in step S505, the CPU 101 causes the communication mode of the printing apparatus 100 to transition to the soft AP mode. In the present embodiment, even if the printing apparatus 100 is USB-connected at a timing at which the soft AP mode operation condition is satisfied, the printing apparatus 100 executes the processing and starts operation in the soft AP mode. Thus, the printing apparatus 100 enters a state in which it is periodically transmitting a beacon, which includes the SSID and the like of the printing apparatus 100 itself. Therefore, the printing apparatus 100 enters a state in which it can provide information that is included in that beacon in response to an AP search from a connection partner apparatus, such as the information processing apparatus 200. When the printing apparatus 100 receives a connection request from the information processing apparatus 200 while being in the soft AP mode, the printing apparatus 100 and the information processing apparatus 200 perform, for example, exchange of connection parameters therebetween, and thereby connect through the AP 118. At this time, the CPU 101 may notify the user that the printing apparatus 100 has transitioned into the soft AP mode by causing the light emitting diode (LED) of the display operation unit 108 to blink or the LCD to perform specific display.

In step S506, the CPU 101 determines whether the printing apparatus 100 is connected to another apparatus by a USB cable (hereinafter, referred to as USB-connected). The determination of step S506 is executed based on a result of detection by the USB function control unit 114. If it is determined that the printing apparatus 100 is USB-connected, the CPU 101 performs USB connection processing in step S507. The USB connection processing is processing by the USB function control unit 114, and a token specifying a target address and endpoint is transmitted. This makes it possible for the printing apparatus 100 and the information processing apparatus 200 to be connected over USB. After step S507, the processing proceeds to step S510. Meanwhile, if it is determined that the printing apparatus 100 is USB-connected, the processing proceeds to step S510. If the printing apparatus 100 becomes USB-connected at a timing prior to step S505, USB connection processing may be executed at a timing that is prior to step S505 and at which the printing apparatus 100 became USB-connected. In such a case, the processing of S507 may be omitted.

In step S510, the printing apparatus 100 has already transitioned into the soft AP mode. As described above, the soft AP mode is a setting mode for setting the communication mode to the printing apparatus 100 itself by receiving AP information from a connection partner apparatus. Therefore, in step S510, the CPU 101 determines whether AP information has been received from the information processing apparatus 200. If it is determined that the AP information has not been received, in step S511, the CPU 101 determines whether a time-out has occurred. Here, a time-out means that the printing apparatus 100 has not connected to a connection partner apparatus or has not received AP information for a predetermined period or more since the printing apparatus 100 transitioned into the soft AP mode in step S505. If it is determined that a time-out has not occurred, the processing is repeated from step S506. If it is determined that a time-out has occurred, in step S508, the CPU 101 stops beacon transmission, disables the AP 118, and ends the soft AP mode. Then, in step S509, the CPU 101 clears the wireless LAN settings information stored in the RAM 103 and ends the processing of FIG. 5. This is because, if a time-out occurs, it is determined that there is no information processing apparatus or AP that can wirelessly connect with the printing apparatus 100 around the printing apparatus 100 and thus there is no need to set the infrastructure mode. The CPU 101 may be configured to notify the user by displaying on the display operation unit 108 that the time-out has occurred. A configuration may also be taken so as to not perform time-out determination and wait to receive the AP information.

Meanwhile, if it is determined in step S510 that the AP information has been received, the CPU 101 ends the soft AP mode in step S512 and performs settings for an AP to be used in the infrastructure mode in step S513. Specifically, the CPU 101 registers an AP corresponding to the received AP information in the RAM 103 as the AP to be used in the infrastructure mode. In addition, if an encryption key, such as a WEP key or a WPA key, is necessary to use the AP, the CPU 101 performs, for example, encryption key registration. Then upon having properly registered the AP, the CPU 101 sets the printing apparatus 100 in the infrastructure mode in which it can be connected with the information processing apparatus 200 through the registered AP. Thus, the printing apparatus 100 operates so as to be able to perform wireless connection with the information processing apparatus 200 through the registered AP.

In FIG. 5, processing for when it is the initial settings state of the printing apparatus 100 has been described. However, the processing of FIG. 5 may be performed at a time other than the initial settings state. For example, the printing apparatus 100 may include a transportation mode for moving its location of use. Therefore, when the printing apparatus 100 is set to the transportation mode and, after having been transported, is set to the soft-on state, the processing of FIG. 5 may be executed. In such a case, in step S502, the CPU 101 determines whether the printing apparatus 100 is in the transportation mode. If it is determined that the printing apparatus 100 is not in the transportation mode, the processing of FIG. 5 is ended. Meanwhile, if it is determined that the printing apparatus 100 is not in the transportation mode, in step S503, the CPU 101 changes information, indicating being in the transportation mode, stored in the RAM 103 or the like. Similarly to the information indicating whether it is the initial settings state, that change may be, for example, change of a flag or deletion of information.

Figure 6:
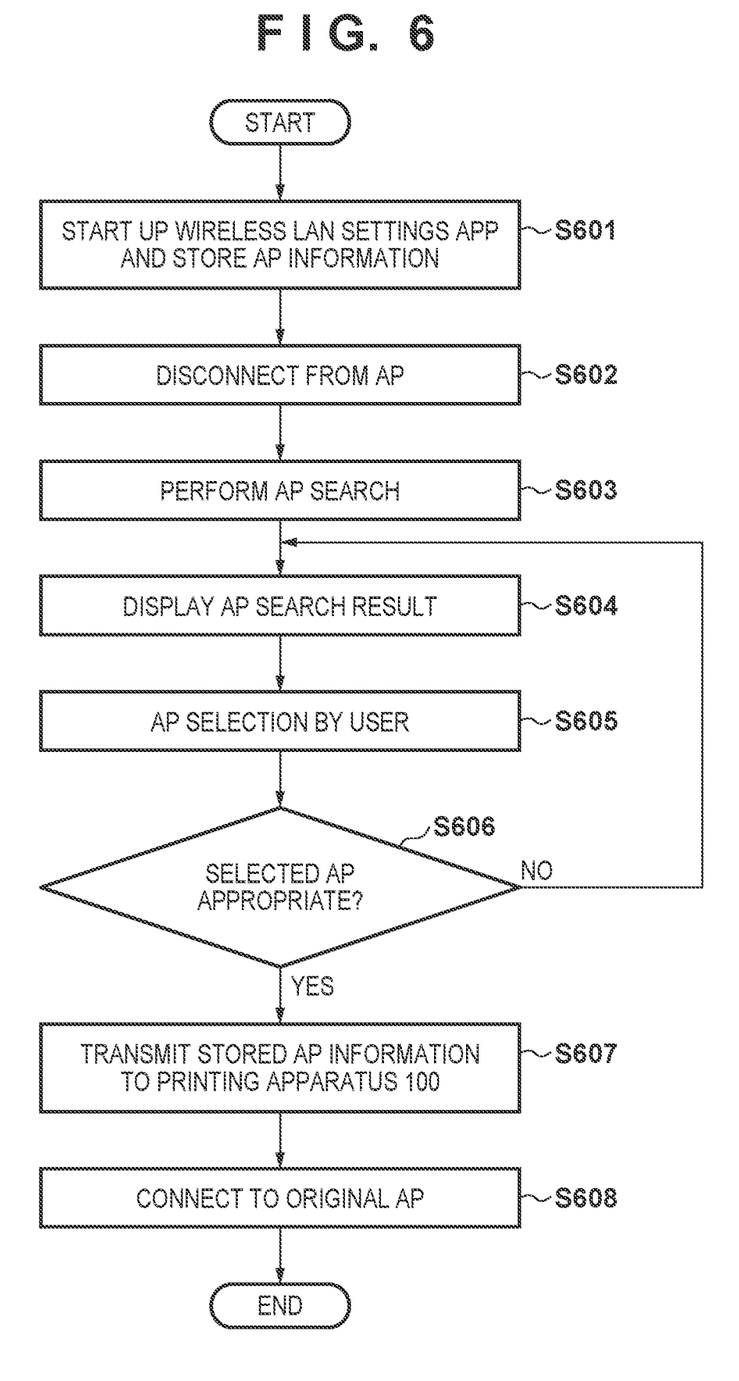
FIG. 6 is a flowchart illustrating processing of the information processing apparatus.

FIG. 6 is a flowchart illustrating processing for the information processing apparatus 200 to set the communication mode in the printing apparatus 100. The processing of FIG. 6 is realized by the CPU 201 loading a control program stored in the ROM 202 or the HDD 211 to the RAM 203 and executing the control program.

In step S601, the CPU 201 accepts an operation by the user and starts up the wireless LAN settings app. The wireless LAN settings app is an application for setting the communication mode in the printing apparatus 100. In the present embodiment, the wireless LAN settings app is used for registering an AP to be used in the infrastructure mode in the printing apparatus 100 and for setting the printing apparatus 100 to the infrastructure mode. The wireless LAN settings app is a program stored in the internal storage device 204 and is installed, in advance, on the information processing apparatus 200 by the user. The AP registration may be performed not using the wireless LAN settings app but using, for example, a service on the Internet or other functions of the information processing apparatus 200 and the printing apparatus 100 via a web browser. At this time, the CPU 201 temporarily stores, in the RAM 203, AP information of an AP to which the information processing apparatus 200 is connected.

In step S602, the CPU 201 disconnects from the currently connected AP. In step S603, the CPU 201 searches for an AP to which the information processing apparatus 200 can access through WLAN unit 209. The AP search may be performed automatically when the wireless LAN settings app is started up or in response to an instruction by the user. The AP search is performed by the WLAN unit 209 receiving a beacon transmitted by a respective AP.

In step S604, the CPU 201 causes the display unit 208 to display a list of APs, which is a search result. At this time, for example, the CPU 201 displays a list of SSIDs, each of a respective AP. A configuration may be taken such that, in step S604, the CPU 201 automatically extracts an AP having an SSID in a format that follows the aforementioned rule and displays the AP. In addition, a configuration may be taken so as to, if there are a plurality of SSIDs in the format that follows the aforementioned rule, display the plurality of SSIDs and allow the user to make a selection.

When the list of APs are displayed in step S604, the user selects, from the search result, the AP of the printing apparatus 100 for which the communication mode is to be set. In step S605, the CPU 201 detects the AP selection by the user. Upon detecting the AP selection, in step S606, the CPU 201 determines whether the selected AP is the AP in the printing apparatus 100, which is the setting target. At this time, specifically, the CPU 201 determines whether the selected AP is an AP having an SSID in the format that follows the aforementioned rule. In a case of a configuration in which an AP having an SSID in the format that follows the aforementioned rule is automatically extracted and displayed in step S604, the processing of step S606 need not be performed.

If it is determined in step S606 that the selected AP is not the AP in the printing apparatus 100, which is the setting target, the processing is repeated from step S604. That is, the CPU 201 waits again to detect AP selection by the user. At this time, the CPU 201 may display, on the display unit 208, a screen for notifying the user that an inappropriate AP has been selected. Further, a configuration may be taken such that, if there is no AP corresponding to the printing apparatus 100, which is the setting target, or there is no AP in the printing apparatus 100, which is desired by the user, the CPU 201 ends the processing of FIG. 6.

If it is determined in step S606 that the selected AP is the AP (here, the AP 118) in the printing apparatus 100, which is the setting target, in step S607, the CPU 201 performs, for example, exchange of connection parameters for performing wireless connection between the information processing apparatus 200 and the printing apparatus 100. Consequently, the information processing apparatus 200 connects to the AP 118 and establishes communication with the printing apparatus 100.

In step S607, the CPU 201 transmits the AP information temporarily stored in the RAM 203 in step S601 to the printing apparatus 100 via the AP 118 with which connection has been established in step S606. The printing apparatus 100 receives the AP information and thereby is set to the infrastructure mode in which connection is possible through an AP that is based on that AP information.

In step S608, the CPU 201 connects again to the AP that is based on the AP information temporarily stored in the RAM 203 in step S601. Consequently, it becomes possible for the information processing apparatus 200 to communicate with the printing apparatus 100 through that AP. At this time, the CPU 201 registers the printing apparatus 100 in the RAM 203 as a printing apparatus to which the information processing apparatus 200 is to be connected with from thereon. Then, the CPU 201 terminates the wireless LAN settings app and ends the processing illustrated in FIG. 6.

The processing of steps S603 to S605 may be executed by another piece of software that is different from the wireless LAN settings app. For example, a configuration may be taken such that another application or the like installed on the information processing apparatus 200 searches for the AP 118 and the wireless LAN settings app obtains a result thereof.

As described above, according to the present embodiment, even if USB connection is established between the printing apparatus 100 and the information processing apparatus 200, the printing apparatus 100 continues the mode for setting the wireless connection. Thus, for example, the user can establish USB connection as well as perform the connection processing necessary for wireless connection with the cloud server 300 in order to enter into the flat-rate use service contract.

Second Embodiment

A second embodiment will be described below with respect to points of difference from the first embodiment. In the first embodiment, the configuration in which, when entering into the flat-rate use service contract to perform printing, the printing apparatus 100 does not cancel the soft AP mode even if USB connection is established at the initial settings state has been described. The present embodiment further describes the initial settings state processing for when the printing apparatus 100 supports both a case where the printing apparatus 100 enters into the flat-rate use service contract to perform printing and a case where the printing apparatus 100 does not enter into the flat-rate use service contract to perform printing, such as a case where the printing apparatus 100 is purchased. In other words, it is assumed that the printing apparatus 100 has a state in which it supports the flat-rate use service and a state in which it does not support the flat-rate use service. It is assumed that, while supporting the flat-rate use service, the printing apparatus 100 is controlled so as to not be able to execute various kinds of functions, such as printing, unless connected to a network that is a path for communicating with the cloud server 300 as described above. However, it is assumed that, while not supporting the flat-rate use service, the printing apparatus 100 is controlled so as to be able to execute various kinds of functions, such as printing, even when not connected to a network that is a path for communicating with the cloud server 300 as described above. In other words, the state in which the printing apparatus 100 does not support the flat-rate use service is a state in which the user of the printing apparatus 100 has not entered into the flat-rate use service contract and the printing apparatus 100 is not associated with the flat-rate use service contract.

Figure 7A:
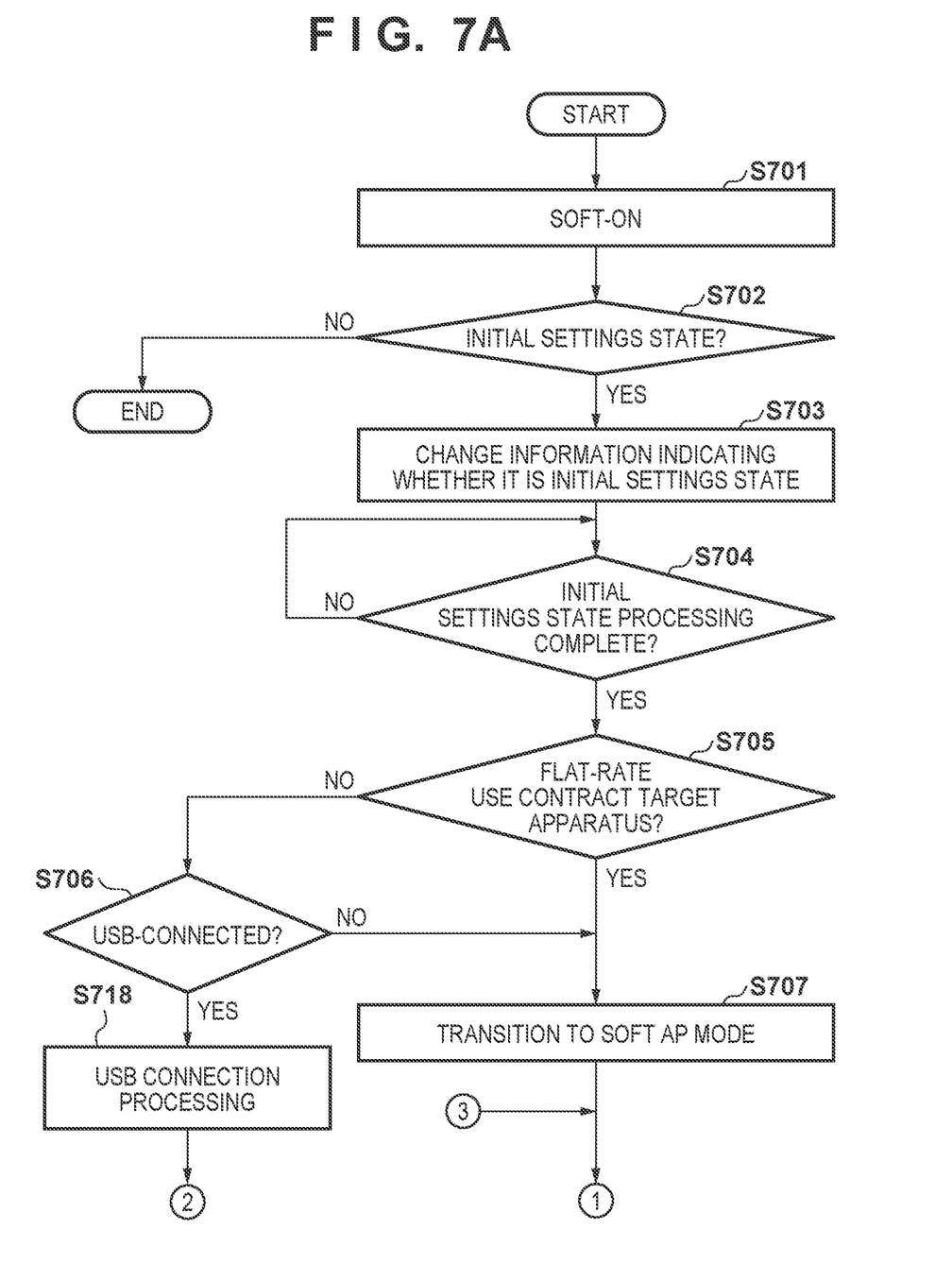
FIGS. 7A and 7B are flowcharts illustrating processing of the printing apparatus.
Figure 7B:
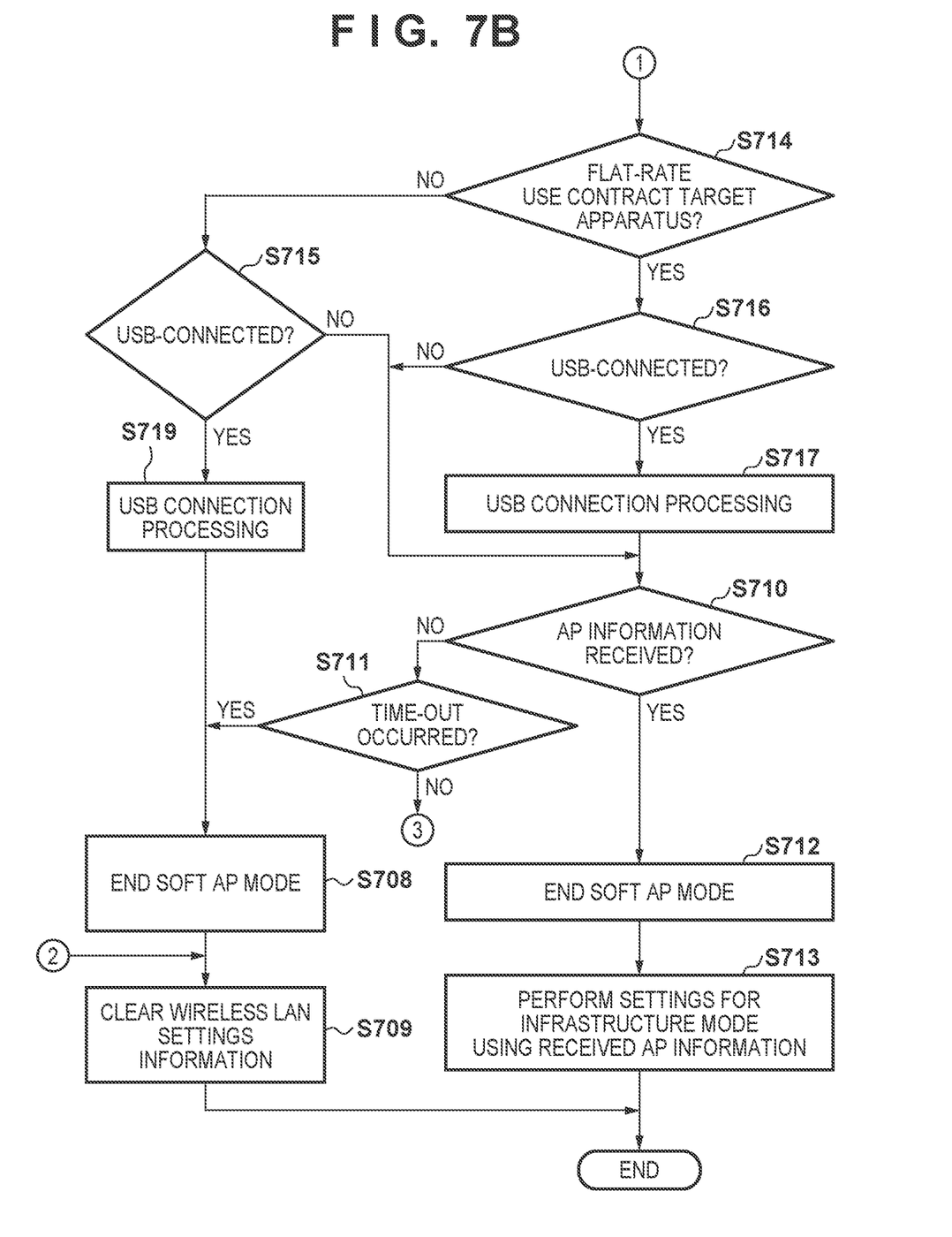

FIGS. 7A and 7B are flowcharts for explaining processing that the printing apparatus 100 executes at the initial settings state according to the present embodiment. The flowchart of FIGS. 7A and 7B is realized by the CPU 101 loading a control program stored in the ROM 102 or the HDD 117 to the RAM 103 and executing the control program.

Since description for the processing of steps S701 to S704 is the same as that of steps S501 to S504 of FIG. 5, the description thereof will be omitted.

If it is determined in step S704 that the processing necessary for the initial settings state has been completed, the processing proceeds to step S705. In step S705, the CPU 101 determines whether the printing apparatus 100 is a model that enters into the flat-rate use service contract to perform printing (a flat-rate use service contract target apparatus) or a model that does not enter into the flat-rate use service contract to perform printing. A flat-rate use service contract target apparatus is the printing apparatus 100 in a state in which it supports the flat-rate use service, and an apparatus that is not a flat-rate use service contract target apparatus is the printing apparatus 100 in a state in which it does not support the flat-rate use service. For example, the CPU 101 accesses a storage region, such as the ROM 102, the RAM 103, or the HDD 117, obtains contract information in which whether to enter into the flat-rate use service contract of the printing apparatus 100 has been set in advance, and performs determination based on that contract information. The information in which whether to enter into the flat-rate use service contract has been set may be written, for example, at the time of factory shipment of the printing apparatus 100 or by a dealer or a service worker. If the printing apparatus 100 does not support the flat-rate use service contract, the form may be that in which the contract information is not obtained.

If it is determined that the printing apparatus 100 is not a flat-rate use service contract target apparatus, in step S706, the CPU 101 determines whether the printing apparatus 100 is USB-connected. For example, the CPU 101 performs the determination based on a USB connection detection result of the USB function control unit 114. If it is determined that the printing apparatus 100 is USB-connected, in step S718, the CPU 101 performs USB connection processing and advances to step S709. The processing of step S718 is similar to the processing of step S507. In addition, description for the processing of step S709 is the same as that of step S509. That is, the CPU 101 clears the wireless LAN settings information stored in the RAM 103. This is because, if it is determined that the printing apparatus 100 and the information processing apparatus 200 are USB-connected, the connection therebetween will be performed using a USB interface, and thus, it is not necessary to set the communication mode in which connection is established using a wireless connection form. In the present embodiment, configuring as such makes it possible to establish connection by USB connection without waiting for the communication mode in which connection is established using a wireless connection form to be set.

Meanwhile, if it is determined that the printing apparatus 100 is not USB-connected, in step S707, the CPU 101 causes the printing apparatus 100 to transition to the soft AP mode, similarly to step S505 of FIG. 5. In addition, when it is determined in step S705 that the printing apparatus 100 is a flat-rate use service contract target apparatus, in step S707, the CPU 101 causes the printing apparatus 100 to transition to the soft AP mode.

In step S714, the CPU 101 determines whether the printing apparatus 100 is a flat-rate use service contract target apparatus. The determination processing of step S714 is the same as the determination processing of step S705.

If it is determined that the printing apparatus 100 is not a flat-rate use service contract target apparatus, in step S715, the CPU 101 determines whether the printing apparatus 100 is USB-connected. The determination processing of step S715 is the same as the determination processing of step S706. A case where it is determined no in step S706 but yes in step S715 is a case where the printing apparatus 100 becomes USB-connected after operation in the soft AP mode has been started. If it is determined that the printing apparatus 100 is USB-connected, in step S719, the USB connection processing, which is similar to the processing in step S507, is performed. Then, in step S708, the CPU 101 stops beacon transmission, disables the AP 118, and ends the soft AP mode. Then, in step S709, the CPU 101 clears the wireless LAN settings information stored in the RAM 103 and ends the processing of FIGS. 7A and 7B.

As described above, in the present embodiment, a configuration is taken so as to detect whether the printing apparatus 100 has become USB-connected even after having transitioned to the soft AP mode. Therefore, even if the printing apparatus 100 becomes USB-connected after having already transitioned into the soft AP mode, the printing apparatus 100 can perform connection according to USB connection without waiting for the communication mode in which connection is established using a wireless connection form to be set. Meanwhile, if it is determined in step S715 that the printing apparatus 100 is not USB-connected, the processing proceeds to step S710.

If it is determined in step S714 that the printing apparatus 100 is a flat-rate use service contract target apparatus, in step S716, the CPU 101 determines whether the printing apparatus 100 is USB-connected. The processing of step S716 is similar to the processing of step S706. If it is determined that the printing apparatus 100 is USB-connected, in step S717, the CPU 101 performs the USB connection processing and advances to step S710. The processing of step S717 is similar to the processing of step S507. As described above, in the present embodiment, the soft AP mode is continued even if the printing apparatus 100 becomes USB-connected after having transitioned to the soft AP mode.

Since description for the processing of steps S710 to S713 is the same as that of steps S510 to S513 of FIG. 5, the description thereof will be omitted. That is, if it is determined in step S711 that a time-out has not occurred, the processing is repeated from step S714. A configuration may be taken such that, if it is determined in step S711 that a time-out has occurred, the CPU 101 notifies the user that a time-out has occurred by performing display accordingly on the display operation unit 108 or notifies the user that USB connection is recommended by performing display accordingly on the display operation unit 108.

As described above, according to the present embodiment, if it is determined in step S705 that the printing apparatus 100 is a flat-rate use service contract target apparatus, the soft AP mode is transitioned into without performing the determination as to whether the printing apparatus 100 is USB-connected. In addition, if it is determined after transitioning to the soft AP mode that the printing apparatus 100 is not a flat-rate use service contract target apparatus and is USB-connected, the soft AP mode is ended. This makes it possible to realize communication connection efficiency. In addition, if it is determined after transitioning to the soft AP mode that the printing apparatus 100 is not a flat-rate use service contract target apparatus and is USB-connected, the soft AP mode is continued.

In FIGS. 7A and 7B, processing for when it is the initial settings state of the printing apparatus 100 has been described. However, the processing of FIGS. 7A and 7B may be performed at a time other than the initial settings state. For example, the printing apparatus 100 may include a transportation mode for moving its location of use. Therefore, when the printing apparatus 100 is set to the transportation mode and, after having been transported, is set to the soft-on state, the processing of FIGS. 7A and 7B may be executed. In such a case, in step S702, the CPU 101 determines whether the printing apparatus 100 is in the transportation mode. If it is determined that the printing apparatus 100 is not in the transportation mode, the processing of FIGS. 7A and 7B is ended. Meanwhile, if it is determined that the printing apparatus 100 is not in the transportation mode, in step S703, the CPU 101 changes information, indicating being in the transportation mode, stored in the RAM 103 or the like. Similarly to the information indicating whether it is the initial settings state, that change may be, for example, change of a flag or deletion of information.

In addition, there may be cases where the user has purchased the printing apparatus 100 and thus uses it without entering into the flat-rate use service contract but thereafter enters into the flat-rate use service contract. In such cases, settings necessary for the start of the flat-rate use service contract service is performed at a timing at which the flat-rate use service contract is entered into. Therefore, a configuration may be taken so as to execute the processing of FIGS. 7A and 7B at that timing. For example, in step S702, the CPU 101 may determine whether the flat-rate use service contract has been entered into based on the information on communication with the cloud server 300, such as an authentication result. Then, when it is determined that the flat-rate use service contract has been entered into, the processing from step S704 onward may be executed.

In each of the above-described embodiments, cases where USB connection is performed have been described. However, it need not be USB connection and may be another cable-based connection method, such as IEEE 1284 or a wired LAN. It may also be a different, wireless-based direct connection method, such as Bluetooth®. In such a case, in steps S506, S706, and S715, it is determined whether connection by the respective connection method is being performed.

In each of the above-described embodiments, it has been described that the processes of the printing apparatus 100 and the information processing apparatus 200 are processes that are executed in the initial settings state. However, they may be performed in a situation different from the initial settings state. For example, the processes of the printing apparatus 100 and the information processing apparatus 200 may be executed when the wireless LAN settings of the printing apparatus 100 are disabled or when the initialization processing is performed by a press of a reset button of the printing apparatus 100.

In each of the above-described embodiments, the configuration in which the printing apparatus 100 transitions to the soft AP mode so as to be found by the information processing apparatus 200 has been described. However, the printing apparatus 100 may shift to another communication mode so long as the printing apparatus 100 can be found by the information processing apparatus 200. For example, the printing apparatus 100 may be shifted to a network setup mode in which it serves as an AP that does not require a password for connection. Further, although a form in which the setting mode for receiving AP information from a connection partner apparatus and setting the communication mode in the printing apparatus 100 itself is the soft AP mode has been described, the present invention is not limited to this form. For example, the setting mode for receiving AP information from a connection partner apparatus and setting the communication mode in the printing apparatus 100 itself may be the WFD mode. The printing apparatus 100 may also be operable in a plurality of soft AP modes. That is, for example, the printing apparatus 100 may be operable in a soft AP mode that is a setting mode for receiving AP information from a connection partner apparatus and setting the communication mode in the printing apparatus 100 itself as well as in a soft AP mode that is a mode for receiving various kinds of jobs, such as a print job, from a connection partner apparatus.

In each of the above-described embodiments, an example in which the communication mode set in the printing apparatus 100 is the infrastructure mode has been described. However, a configuration may be taken so as to be able to set another communication mode. The communication mode to be set may be, for example, a direct communication mode, such as the WFD mode, the WFD extension mode, or the ad hoc mode. In each of the above-described embodiments, the configuration in which only one type of communication mode is set in the printing apparatus 100 by the soft AP mode has been described. However, a configuration may be taken so as to be able to select one of a plurality of communication modes and set the communication mode in the printing apparatus 100. For example, a configuration may be taken such that, if it is determined in step S510 that AP information has not been received, the CPU 101 sets the printing apparatus 100 to the direct communication mode or the ad hoc mode, which are communication modes in which communication can be performed with the information processing apparatus without the need for AP information. A configuration may be taken such that the user can select the communication mode to be set in the printing apparatus 100 on a setting screen.

In each of the above-described embodiments, the configuration in which the mode for operating in a form of wireless-based connection, which is referred to as the infrastructure mode, is set in the printing apparatus 100 has been described. However, a configuration may be taken so as to set a mode for operating in a form of connection by wire, USB, or the like (the wired communication mode or the USB communication mode) in the printing apparatus 100. This is, for example, when a USB port is provided in the router 403. Further, the printing apparatus 100 may be set to the aforementioned USB communication mode at the same time as when the wireless LAN settings information is cleared.

In the flowchart of each of the embodiments, the order of processes may be switched, not all of the processes need to be performed, and the contents of the processes may be changed so long as the effects of each of the above-described embodiments can be realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-198737, filed Dec. 13, 2022, which is hereby incorporated by reference herein in its entirety.

What is claimed is:

1. A printing apparatus capable of executing printing based on a flat-rate use service, the printing apparatus comprising:

at least one memory and at least one processor which function as:
a first connection unit for first connection between a printing apparatus and a first apparatus and for which a first method is used;
a second connection unit for second connection between the printing apparatus and a second apparatus and for which a second method is used;
a detection unit configured to detect that the second connection has been established; and
a control unit configured to cause the printing apparatus to operate in a predetermined mode for performing setting for establishing the first connection, wherein
even if it is detected while the printing apparatus is operating in the predetermined mode that the second connection has been established, the control unit causes the printing apparatus to continue operation in the predetermined mode.

2. The printing apparatus according to claim 1, wherein the operation in the predetermined mode in the printing apparatus is started based on a predetermined condition being satisfied.

3. The printing apparatus according to claim 2, wherein in a case where the predetermined condition has been satisfied, even if the second connection is established at a timing at which the predetermined condition is satisfied, the operation in the predetermined mode in the printing apparatus is started.

4. The printing apparatus according to claim 2, further comprising:
a first determination unit configured to determine whether setting for executing printing based on the flat-rate use service has been performed in the printing apparatus, wherein
in a case where the predetermined condition has been satisfied and it is determined that the setting for executing printing based on the flat-rate use service has been performed in the printing apparatus, even if the second connection is established at a timing at which the predetermined condition is satisfied, the operation in the predetermined mode in the printing apparatus is started.

5. The printing apparatus according to claim 3, wherein in a case where the predetermined condition has been satisfied and it is determined that setting for executing printing based on the flat-rate use service has not been performed in the printing apparatus, if the second connection is established at a timing at which the predetermined condition is satisfied, the operation in the predetermined mode in the printing apparatus is started.

6. The printing apparatus according to claim 2, wherein the predetermined condition includes a power of the printing apparatus being turned on.

7. The printing apparatus according to claim 2, wherein the predetermined condition includes an initial setting of the printing apparatus not having been performed.

8. The printing apparatus according to claim 2, wherein the predetermined condition includes a contract related to the flat-rate use service having been entered into.

9. The printing apparatus according to claim 1 further comprising:
a second determination unit configured to determine whether setting for executing printing based on the flat-rate use service has been performed in the printing apparatus, wherein
in a case where it is determined that the setting for executing printing based on the flat-rate use service has been performed in the printing apparatus, even if it is detected that the second connection has been established while the printing apparatus is operating in the predetermined mode, the operation in the predetermined mode is continued.

10. The printing apparatus according to claim 8, wherein in a case where it is determined that setting for executing printing based on the flat-rate use service has been performed in the printing apparatus and it is detected that the second connection has been established while the printing apparatus is operating in the predetermined mode, the operation in the predetermined mode is ended.

11. The printing apparatus according to claim 1, wherein the first connection is connection between the printing apparatus and an access point external to the printing apparatus and for which a communication method conforming to the IEEE 802.11 series is used.

12. The printing apparatus according to claim 1, wherein the second connection is connection between the printing apparatus and the second apparatus and for which a method that uses Universal Serial Bus (USB) is used.

13. The printing apparatus according to claim 1, wherein the predetermined mode is a mode in which the printing apparatus operates as an access point.

14. The printing apparatus according to claim 1, further comprising:
a third connection unit for third connection between the printing apparatus operating in the predetermined mode and a third apparatus and for which a third method is used; and
a receiving unit configured to receive information for the first connection via the third connection, wherein
in a case where the information for the first connection is received, the first connection is established.

15. The printing apparatus according to claim 13, wherein in a case where the information for the first connection is received, the operation in the predetermined mode is ended.

16. The printing apparatus according to claim 13, wherein the third connection is connection between the printing apparatus operating in the predetermined mode and the third apparatus and does not go through an access point external to the printing apparatus and for which a communication method that uses Wi-Fi is used.

17. The printing apparatus according to claim 13, wherein in a case where a predetermined amount of time has elapsed from the start of the operation in the predetermined mode, without the information for the first connection being received, the operation in the predetermined mode is ended.

18. The printing apparatus according to claim 1, wherein processing based on the flat-rate use service includes processing for communication with a cloud server via the first connection.

19. The printing apparatus according to claim 1, wherein the flat-rate use service is a service related to use of at least one of a printing material, paper, and a replacement component.

20. The printing apparatus according to claim 1, wherein in a case where setting for executing printing based on the flat-rate use service is performed in the printing apparatus, control is performed so as to not be able to execute printing based on the flat-rate use service in the printing apparatus unless the printing apparatus is in a state in which the printing apparatus can communicate with the cloud server.

21. A printing apparatus capable of executing printing based on a flat-rate use service, the printing apparatus comprising:
- at least one memory and at least one processor which function as:
- a first connection unit for first connection between a printing apparatus and a first apparatus and for which a first method is used;
- a second connection unit for second connection between the printing apparatus and a second apparatus and for which a second method is used;
- a control unit configured to cause the printing apparatus to operate in a predetermined mode for performing setting for establishing the first connection based on a predetermined condition being satisfied, wherein
- in a case where the predetermined condition has been satisfied, even if the second connection is established at a timing at which the predetermined condition is satisfied, the control unit starts operation in the predetermined mode in the printing apparatus.

\* \* \* \* \*